(12) United States Patent
Yamazaki et al.

(10) Patent No.: US 9,064,296 B2
(45) Date of Patent: Jun. 23, 2015

(54) TERMINAL DEVICE, IMAGE PROCESSING METHOD AND IMAGE PROCESSING PROGRAM EXECUTED BY A TERMINAL DEVICE

(75) Inventors: Hitoshi Yamazaki, Sayama (JP); Kenji Nakamura, Tokorozawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 13/879,192

(22) PCT Filed: Oct. 22, 2010

(86) PCT No.: PCT/JP2010/068712
§ 371 (c)(1),
(2), (4) Date: Apr. 12, 2013

(87) PCT Pub. No.: WO2012/053102
PCT Pub. Date: Apr. 26, 2012

(65) Prior Publication Data
US 2013/0208133 A1  Aug. 15, 2013

(51) Int. Cl.
*H04N 5/217* (2011.01)
*H04N 5/232* (2006.01)
*H04N 5/262* (2006.01)
*G06T 3/00* (2006.01)
*G01C 21/36* (2006.01)

(52) U.S. Cl.
CPC .............. *G06T 3/00* (2013.01); *G01C 21/3647* (2013.01); *H04N 5/217* (2013.01); *H04N 5/23293* (2013.01); *H04N 5/2628* (2013.01)

(58) Field of Classification Search
CPC ...... G01C 21/3647; G06T 3/00; H04N 5/217; H04N 5/23258; H04N 5/23293
USPC ................................ 348/208.2, 143, 116, 148
See application file for complete search history.

(56) References Cited

U.S. PATENT DOCUMENTS

| 2005/0122311 A1* | 6/2005 | Lee et al. ................. 345/158 |
| 2009/0046151 A1* | 2/2009 | Nagaoka et al. .......... 348/148 |
| 2010/0007751 A1* | 1/2010 | Icho et al. ................ 348/222.1 |
| 2010/0082437 A1  | 4/2010 | Tamayama et al. |
| 2010/0245575 A1* | 9/2010 | Mori et al. ................ 348/148 |

(Continued)

FOREIGN PATENT DOCUMENTS

| CN | 101390383 | 3/2009 |
| JP | 2002-074339 | 3/2002 |

(Continued)

OTHER PUBLICATIONS

International Search Report, PCT/JP2010/068712, Dec. 7, 2010.

*Primary Examiner* — Mekonnen Dagnew
(74) *Attorney, Agent, or Firm* — Young & Thompson (57) ABSTRACT

A terminal device is mounted on and used in a movable body such as a vehicle. The terminal device includes an image capturing unit, an image generating unit and a display unit. The image generating unit corrects the captured image captured by the image capturing unit based on the deviation of the image capturing direction of the image capturing unit with respect to the traveling direction of the movable body, and generates a display image. Thus, based on the deviation angle of the image capturing direction with respect to the traveling direction of the movable body, the captured image can be appropriately corrected to generate the display image.

12 Claims, 8 Drawing Sheets

(56) References Cited

U.S. PATENT DOCUMENTS

2011/0063466 A1* 3/2011 Imata et al. .............. 348/222.1
2011/0304710 A1* 12/2011 Ito et al. ...................... 348/51

FOREIGN PATENT DOCUMENTS

| JP | 2010-102685 | 5/2010 |
|----|-------------|--------|
| WO | WO 2007/097431 | 8/2007 |

* cited by examiner

TERMINAL DEVICE, IMAGE PROCESSING METHOD AND IMAGE PROCESSING PROGRAM EXECUTED BY A TERMINAL DEVICE

TECHNICAL FIELD

The present invention relates to terminal device which is installed in a movable body and which has an image capturing means for capturing image outside the movable body.

BACKGROUND TECHNIQUE

A technique of this kind is disclosed in Patent Document 1, for example. Patent Document 1 discloses a technique of using a camera capable of capturing image of broader area than necessary area to detect an optical axis of a camera, deviation of angle of view and rotation of viewing field based on images corresponding to two, i.e., left and right marks set within its viewing field, and thereby adjusting an image capturing area by the camera in accordance with the detection result.

PRIOR ART DOCUMENTS

Patent Documents

Patent Document 1: Japanese Patent Application Laid-open under No. 2002-74339

SUMMARY OF INVENTION

Problem to be Solved by the Invention

However, since the technique disclosed in the above-mentioned Patent Document 1 performs image analysis on the captured image, the processing burden tends to be large.

The above is one example of the problem to be solved by the present invention. It is an object of the present invention to provide a terminal device, image processing method and image processing program executed by the terminal device, capable of appropriately correcting the captured image by simple processing.

Means for Solving the Problem

According to the present invention, a terminal device mounted on a movable body, includes: an image capturing unit; an image generating unit which corrects a captured image captured by the image capturing unit based on a deviation of an image capturing direction of the image capturing unit with respect to a traveling direction of the movable body, and generates a display image; and a display unit which displays the display image generated by the image generating unit.

According to the present invention, an image processing method executed by a terminal device which includes an image capturing unit and a display unit and which is mounted on a movable body, includes: an obtaining process which obtains a captured image captured by the image capturing unit; an image generating process which corrects the captured image based on a deviation of an image capturing direction of the image capturing unit with respect to a traveling direction of the movable body, and generates a display image; and a display process which displays the display image generated by the image generating process on the display unit.

According to the present invention, an image processing program is executed by a terminal device, which includes an image capturing unit, a display unit and a computer and which is mounted on a movable body, the program making the computer function as: an obtaining unit which obtains a captured image captured by the image capturing unit; an image generating unit which corrects the captured image based on a deviation of an image capturing direction of the image capturing unit with respect to a traveling direction of the movable body, and generates a display image; and a display control unit which displays the display image generated by the image generating unit on the display unit.

MODE TO EXERCISE THE INVENTION

According to one aspect of the present invention, there is provided a terminal device mounted on a movable body, including: an image capturing unit; an image generating unit which corrects a captured image captured by the image capturing unit based on a deviation of an image capturing direction of the image capturing unit with respect to a traveling direction of the movable body, and generates a display image; and a display unit which displays the display image generated by the image generating unit.

The above terminal device is installed and used in a movable body such as a vehicle. The terminal device includes an image capturing unit such as a camera and a display unit such as a display. In addition, the terminal device includes an image generating unit which corrects a captured image captured by the image capturing unit based on a deviation of an image capturing direction of the image capturing unit with respect to a traveling direction of the movable body, and generates a display image. Specifically, the image generating unit performs a processing of extracting an image to be displayed from the captured image based on the deviation of the image capturing direction with respect to the traveling direction, i.e., a processing of taking in apart of the captured image as the display image.

According to the above terminal device, based on the deviation angle of the image capturing direction with respect to the traveling direction of the movable body, the captured image can be appropriately corrected to generate the display image. Also, according to the above terminal device, since it does not perform an image analysis of the captured image, an appropriate display image can be generated from the captured image by simple processing.

In one mode of the above terminal device, the image generating unit obtains the deviation of the image capturing direction with respect to the traveling direction when the movable body is traveling straight, and corrects the captured image based on the obtained deviation. By this, the correction of the captured image can be accurately performed.

In another mode of the above terminal device, the image generating unit obtains the deviation of the image capturing direction with respect to the traveling direction when acceleration of the movable body is larger than a predetermined value, and corrects the captured image based on the obtained deviation. By this, when the deviation of the image capturing direction with respect to the traveling direction is obtained based on the acceleration of the movable body, for example, the deviation can be obtained by using a stable acceleration value. Therefore, the correction of the captured image can be accurately performed.

In a preferred example, the image generating unit obtains an output from an acceleration sensor which detects acceleration of the movable body in two-dimensional directions, and obtains the deviation of the image capturing direction with respect to the traveling direction based on the output from the acceleration sensor. For example, the acceleration sensor is configured to be able to detect the acceleration in the traveling direction and the acceleration in the left-right direction of the vehicle, and the image generating unit obtains the deviation based on the ratio of the acceleration in the traveling direction to the acceleration in the left-right direction.

In still another mode of the above terminal device, the image generating unit repeatedly obtains the deviation of the image capturing direction with respect to the traveling direction in a predetermined cycle, and corrects the captured image based on the obtained deviation. By this, it is possible to perform the correction of the captured image in accordance with the deviation of the image capturing direction with respect to the traveling direction at any time.

Still another mode of the above terminal device further includes a mounting change detecting unit which detects a change of mounting condition of the terminal device, and the image generating unit obtains the deviation of the image capturing direction with respect to the traveling direction when the mounting change detecting unit detects the change of the mounting condition, and corrects the captured image based on the obtained deviation. By this, in such a situation that the deviation of the image capturing direction with respect to the traveling direction is changed and the captured image is desired to be newly corrected, the correction of the captured image can be appropriately performed. Also, according to this mode, since the captured image is corrected only when the correction is supposed to be necessary, the processing burden of the correction can be reduced.

In still another mode of the above terminal device, the image generating unit corrects the captured image such that a center position of the display image in a left-right direction coincide with a position corresponding to the traveling direction of the movable body. By this, it is possible to appropriately generate the display image whose center position coincides with the position corresponding to the traveling direction of the movable body.

Preferably, in the above terminal device, the image generating unit performs a correction of setting a position, which is obtained by shifting the center position of the captured image in the left-right direction to the left-right direction by an amount corresponding to the deviation of the image capturing direction with respect to the traveling direction, to the center position of the display image in the left-right direction, and thereby generates the display image.

Also, preferably, the image generating unit generates an image, which is prescribed by the center position after the correction and which is within a predetermined range in the captured image, as the display image.

In a preferred example, the terminal device is attachable to and removable from a holding device mounted on the movable body.

According to another aspect of the present invention, there is provided an image processing method executed by a terminal device which includes an image capturing unit and a display unit and which is mounted on a movable body, including: an obtaining process which obtains a captured image captured by the image capturing unit; an image generating process which corrects the captured image based on a deviation of an image capturing direction of the image capturing unit with respect to a traveling direction of the movable body, and generates a display image; and a display process which displays the display image generated by the image generating process on the display unit.

According to still another aspect of the present invention, there is provided an image processing program executed by a terminal device which includes an image capturing unit, a display unit and a computer and which is mounted on a movable body, the program making the computer function as: an obtaining unit which obtains a captured image captured by the image capturing unit; an image generating unit which corrects the captured image based on a deviation of an image capturing direction of the image capturing unit with respect to a traveling direction of the movable body, and generates a display image; and a display control unit which displays the display image generated by the image generating unit on the display unit.

Also by the image processing method and the image processing program described above, the captured image can be appropriately corrected to generate the display image based on the deviation angle of the image capturing direction with respect to the traveling direction of the movable body.

Embodiment

The preferred embodiment of the present invention will now be described below with reference to the attached drawings.

[Device Configuration]

First, a configuration of a terminal device according to this embodiment will be described.

Figure 1A:
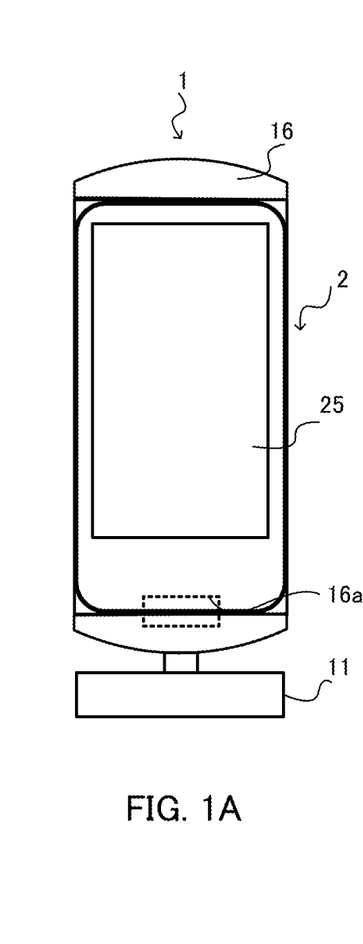
FIGS. 1A to 1C illustrate a terminal device in a state held by a terminal holding device.
Figure 1B:
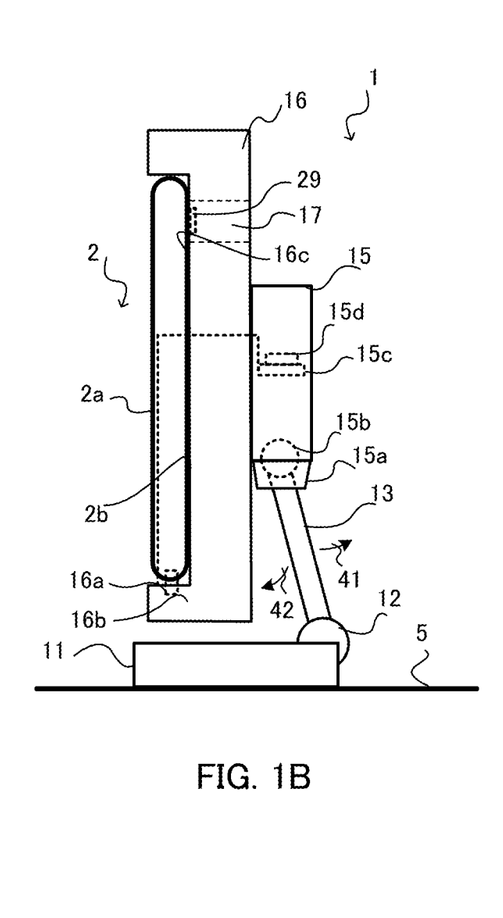
Figure 1C:
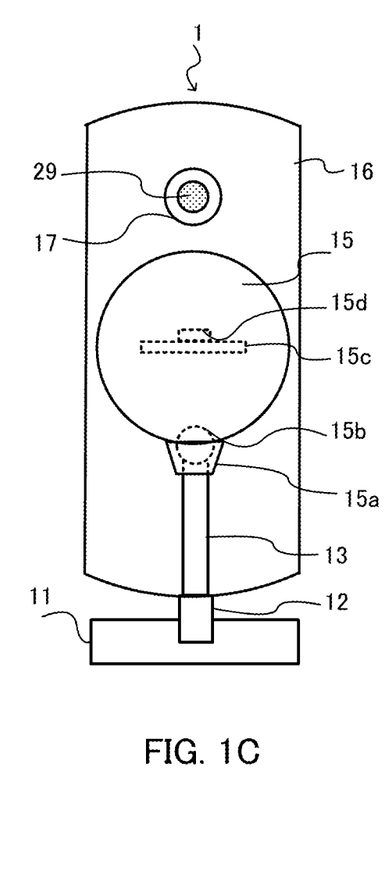

FIGS. 1A to 1C illustrate the terminal device 2 in such a state that it is held by a terminal holding device 1. FIG. 1A is a front view, FIG. 1B is a side view, and FIG. 1C is a rear view.

The terminal holding device 1 mainly includes a base 11, a hinge 12, an arm 13, a substrate holder 15 and a terminal holder 16. The terminal holding device 1 functions as a so-called cradle, to which the terminal device 2 such as a smartphone is attached.

The base 11 functions as a base used when the terminal holding device 1 is attached to a movable body such as a vehicle. For example, the base 11 is provided with a sucker or an adhesive tape at its underside, and the base 11 is fixed to an installation surface 5 such as a dashboard of the vehicle by the adhesive tape.

The hinge 12 is fixed to the arm 13, and is attached to the base 11 in a manner rotatable with respect to the base 11. By the rotation of the hinge 12, the arm 13 swings in a front-rear direction of the terminal device 2, i.e., in a direction of the arrows 41 and 42 in FIG. 1B. Namely, by rotating the arm 13 via the hinge 12 with respect to the base 11 fixed to the installation surface 5 of the vehicle, it is possible to adjust the installation angle of the substrate holder 15 and the terminal holder 16 with respect to the installation surface 5.

The substrate holder 15 includes a cover 15a, a ball link 15b, a sensor substrate 15c and a sensor 15d. The ball link 15b is attached to an upper end of the arm 13, and holds the substrate holder 15 at an arbitrary angle with respect to the arm 13. The cover 15a is provided at a lower end of the substrate holder 15, and has a function of restricting the rotation of the substrate holder 15 with respect to the arm 13. The sensor substrate 15c is provided inside of the substrate holder 15, and the sensor substrate 15c is provided with the sensor 15d. A preferred example of the sensor 15d is an acceleration sensor which can detect acceleration in two-dimensional directions.

The terminal holder 16 is a holder which holds the terminal device 2. The terminal holder 16 includes a connector 16a and a wiring 16b. The connector 16a is provided at the bottom of the front surface, i.e., the surface on which the terminal device 2 is set, and is connected to the connector of the terminal device 2 when the terminal device 2 is set to the terminal holder 16. The connector 16a is electrically connected to the sensor substrate 15c via the wiring 16b. Therefore, the detection signal of the sensor 15d is supplied to the terminal device 2 via the sensor substrate 15c, the wiring 16b and the connector 16a.

The terminal device 2 includes a front surface 2a, which is a front side of the body of the terminal device 2 and includes a display unit 25 such as an LCD panel, and a rear surface 2b which is a rear side of the body of the terminal device 2. Normally, the terminal device 2 is formed in a rectangular flat-plate shape, and the front surface 2a and the rear surface 2b are substantially parallel with each other.

The terminal holder 16 has a contact surface 16c at its front side. When the terminal device 2 is attached to the terminal holder 16, the contact surface 16c contacts and supports the rear surface 2b of the terminal device 2. In the example shown in FIGS. 1A and 1B, the contact surface 16c of the terminal holder 16 is formed such that its entire surface contacts the rear surface 2b of the terminal device 2. Instead, it is possible to employ such a configuration that one or plural parts of the contact surface 16c is formed to be partly protruding, and only the protruding parts contact the rear surface 2b of the terminal device 2.

On the rear surface 2b of the terminal device, a camera 29 is provided. Also, the terminal holder 16 of the terminal holding device 1 is formed with a hole 17 at the position confronting the camera 29 when the terminal device 2 is held by the terminal holding device 1. The hole 17 has a diameter larger than the diameter of the lens of the camera 29. Thus, in a state that the terminal device 2 is held by the terminal holder 1, the camera 29 is not suffered from the outer wall of the terminal holder 16 and can capture image behind the terminal holder 16. Specifically, the camera 29 captures image outside the vehicle.

In the example shown in FIGS. 1B and 1C, the terminal holder 16 is configured to cover substantially entire area of the rear surface 2b of the terminal device 2 and is formed with the hole 17 at the position confronting the camera 29 of the terminal device 2. Instead, the terminal holder 16 may be configured to cover only the area lower than the position of the camera 29 of the terminal device 2 when the terminal device 2 is held by the terminal holding device 1. In one example, the contact surface 16c of the terminal holder 16 may be formed into a shape extending to the position lower than the position at which the camera 29 of the terminal device 2 is provided (i.e., a shape in which the contact surface 16c does not exist above the position at which the camera 29 of the terminal device 2 is provided). In such an example, it is not necessary to form the hole 17 on the terminal holding device 1.

While the camera 29 is provided substantially on the center line in the left-right direction of the rear surface 2b of the terminal device 2, it is not limited that the camera 29 is provided at such a position. For example, the camera 29 may be provided at a position shifted, to some extent, from the center line in the left-right direction of the rear surface 2b. In this case, instead of forming the hole 17 on the terminal holder 16, a cutout may be formed at a part including the position of the camera 29 of the terminal device 2 when the terminal device 2 is held by the terminal holding device 1.

Figure 2:
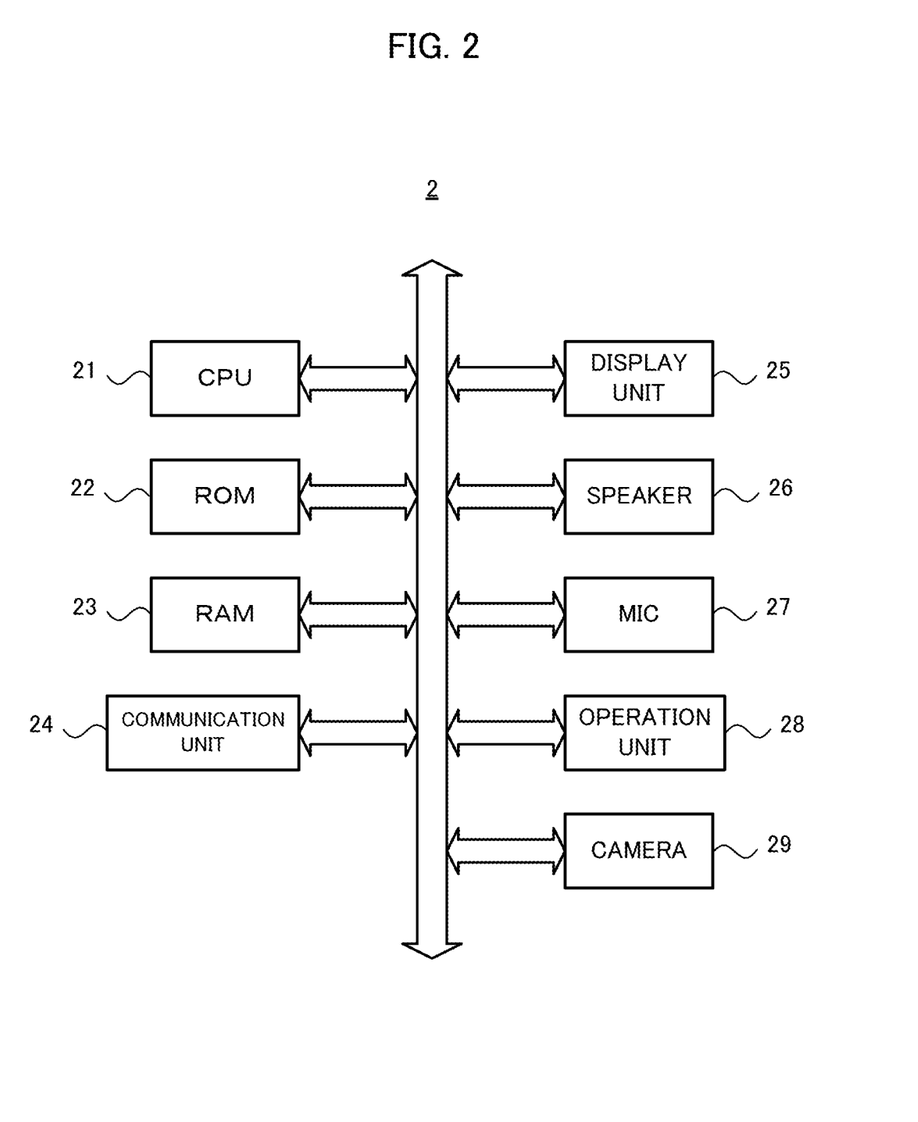
FIG. 2 illustrates a schematic configuration of the terminal device.

FIG. 2 schematically illustrates a configuration of the terminal device 2. As illustrated in FIG. 2, the terminal device 2 mainly includes a CPU 21, a ROM 22, a RAM 23, a communication unit 24, a display unit 25, a speaker 26, a microphone 27, an operation unit 28 and the camera 29. The terminal device 2 is a portable-type terminal device such as a smartphone having a telephone call function.

The CPU (Central Process Unit) 21 executes control of the terminal device 2 in its entirety. The ROM (Read Only Memory) 22 has a non-volatile memory, not shown, storing control program for controlling the terminal device 2. The RAM (Random Access Memory) 23 stores data set by a user via the operation unit 26 in a readable manner, and provides a working area for the CPU 21.

The communication unit 24 is configured to be able to perform wireless communication with other terminal device 2 via a communication network. The display unit 25 may be a liquid crystal display, and displays characters and images to the user. The speaker 26 outputs sounds to the user. The microphone 27 collects voices spoken by the user.

The operation unit 28 may be operation buttons or a touch panel type input device provided on a casing of the terminal device 2, to which various selections and instructions by the user is inputted. If the display unit 25 is a touch panel type, the touch panel provided on the display screen of the display unit 25 may function as the operation unit 28.

The camera 29 may be a CCD camera, for example, and is provided on the rear surface 2b of the terminal device 2 as illustrated in FIGS. 1B and 1C. Basically, the direction of the optical axis (an axis extending vertically from the center of the lens) of the camera 29 coincides with the vertical direction of the rear surface of the terminal device 2 (i.e., the normal direction). The camera 29 may be provided, not only on the rear surface 2b of the terminal device 2, but also on the front surface 2a of the terminal device 2.

The camera 29 corresponds to an example of an image capturing unit of the present invention, the CPU 21 corresponds to an example of an image generating unit of the present invention (the detail will be described later), and the display unit 25 corresponds to an example of a display unit of the present invention.

[Captured Image Correcting Method]

Next, the description will be given of a correcting method of the captured image by the camera 29, executed by the CPU 21 in this embodiment.

Figure 3:
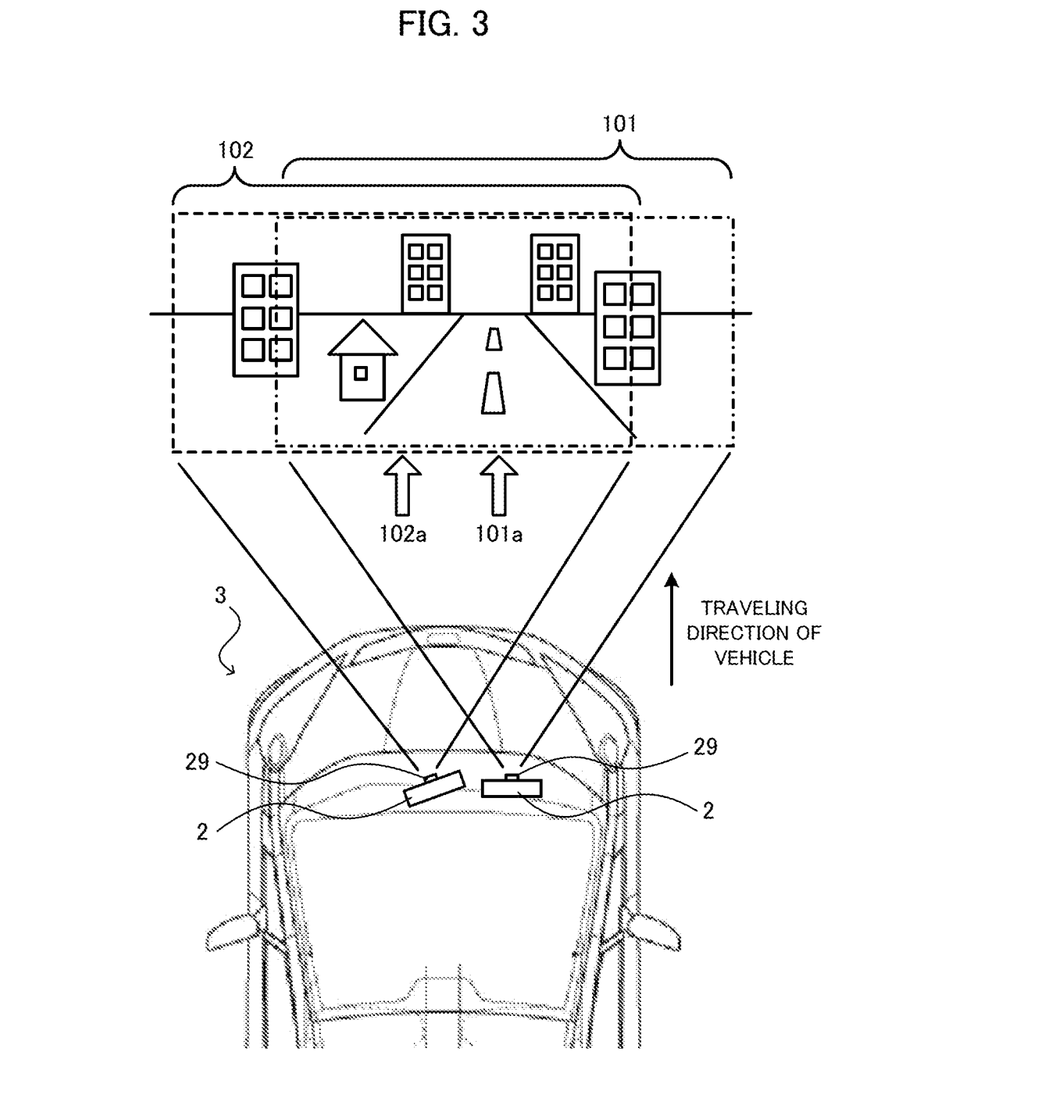
FIG. 3 is a diagram for explaining a drawback taking place in accordance with a mounting position of the terminal device.

First, with reference to FIG. 3, the drawback caused according to the mounting position of the terminal device 2 will be described. FIG. 3 illustrates a view of the terminal device 2, observed from upside thereof, in a state mounted in the compartment of the vehicle 3, and also illustrates an example of the captured image by the camera 29 of the terminal device 2. In FIG. 3, for convenience of explanation, the terminal device 2 is illustrated in a simplified manner and the illustration of the terminal holding device 1 is omitted. Actually, the terminal device 2 is mounted in the compartment of the vehicle 3 in a state held by the terminal holding device 1.

FIG. 3 illustrates the example in which the terminal device 2 is mounted generally in front of the driver's seat and the example in which the terminal device 2 is mounted between the driver's seat and the assistant driver's seat. (In both cases, the terminal device 2 is mounted on the dashboard.) Normally, in order to observe the display unit 25 of the terminal device 2, the user mounts the terminal device 2 such that the display unit 25 is directed to the user. In a case where the terminal device 2 is mounted generally in front of the driver's seat, if the terminal device 2 is mounted such that the display unit 25 is directed to the user, the terminal device 2 tends be directed to the traveling direction of the vehicle 3. Specifically, since the front surface 2a on which the display unit 25 is provided and the rear surface 2b on which the camera 29 is provided are substantially in parallel with each other in the terminal device 2, the front direction (vertical direction) of the rear surface 2b tends to roughly coincide with the traveling direction of the vehicle 3. In other words, the direction along the front surface 2a and the rear surface 2b of the terminal device 2 tends to be almost perpendicular to the traveling direction.

In contrast, in the case where the terminal device 2 is mounted between the driver's seat and the assistant driver's seat, if the terminal device 2 is mounted such that the display unit 25 is directed to the user, the terminal device 2 tends to be not directed to the traveling direction of the vehicle 3. Specifically, since the front surface 2a on which the display unit 25 is provided and the rear surface 2b on which the camera 29 is provided are substantially in parallel with each other in the terminal device 2, the front direction (vertical direction) of the rear surface 2b tends to be not coincident with the traveling direction of the vehicle 3. In other words, the direction along the front surface 2a and the rear surface 2b of the terminal device 2 tends to be not generally perpendicular to the traveling direction.

When the terminal device 2 is mounted generally in front of the driver's seat, it may affect the visual field of the user. Depending on the kind of the vehicle, it may be difficult to mount the terminal device 2 generally in front of the driver's seat. Therefore, the terminal device 2 tends to be mounted on the position other than the front of the driver's seat.

In FIG. 3, the captured image 101 shown by the dot and dash line indicates an example of the image captured by the camera 29 when the terminal device 2 is mounted generally in front of the driver's seat. The captured image 102 shown by the broken line 102 indicates an example of the image captured by the camera 29 when the terminal device 2 is mounted between the driver's seat and the assistant driver's seat. In FIG. 3, it is understood that the center position 101a in the left-right direction of the captured image 101 and the center position 102a in the left-right direction of the captured image 102 do not coincide. This means that the image capturing directions of the camera 29 do not coincide in the case where the terminal device 2 is mounted generally in front of the driver's seat and in the case where the terminal device 2 is mounted between the driver's seat and the assistant driver's seat.

The "image capturing direction" of the camera 29 means the direction of the camera 29, and generally coincides with the vertical direction of the rear surface 2b of the terminal device 2. More specifically, the "image capturing direction" corresponds to the optical axis direction of the lens of the camera 29. In this embodiment, it is assumed that the front-rear direction (specifically the front direction) of the vehicle 3 is used as the "traveling direction" of the vehicle 3.

Specifically, in the case where the terminal device 2 is mounted generally in front of the driver's seat, since the vertical direction of the rear surface 2b to which the camera 29 is provided in the terminal device 2 generally coincides with the traveling direction of the vehicle 3 as described above, the image capturing direction of the camera 29 generally coincides with the traveling direction. Therefore, in this case, the center position 101a of the captured image 101 generally coincides with the position corresponding to the traveling direction of the vehicle 3 in the captured image 101. In contrast, in the case where the terminal device 2 is mounted between the driver's seat and the assistant driver's seat, since the vertical direction of the rear surface 2b to which the camera 29 is provided in the terminal device 2 does not coincide with the traveling direction of the vehicle 3 as described above, the image capturing direction of the camera 29 does not coincide with the traveling direction. Therefore, in this case, the center position 102a of the captured image 102 generally does not coincide with the position corresponding to the traveling direction of the vehicle 3 in the captured image 102.

Here, there is known a navigation using an actually captured image (corresponding to the image generated based on the captured image) by the camera 29 of the terminal device 2, hereinafter referred to as "display image"). This navigation is called AR (AR: Augmented Reality) navigation, in which the image for the route guide, such as the direction and the distance to the destination, is displayed in a manner superimposed on the display image. At the time of executing the AR navigation, if the image capturing direction of the camera 29 and the traveling direction of the vehicle 3 do not coincide, the AR navigation cannot be appropriately executed. For example, the image for the route guide is not displayed at an appropriate position in the display image, or no position for displaying the image for the route guide is found.

This drawback tends to be caused, not because of the mounting position of the terminal device 2 itself in the compartment, but because the direction of the terminal device 2 is variously set such that the display unit 25 is directed to the user and hence the image capturing direction of the camera 29 deviates from the traveling direction of the vehicle 3.

In this embodiment, in order to overcome the drawback caused when the image capturing direction of the camera 29 and the traveling direction of the vehicle 3 do not coincide as described above, the captured image of the camera 29 is corrected. Specifically, the CPU 21 in the terminal device 2 corrects the captured image of the camera 29 based on the deviation of the image capturing direction of the camera 29 with respect to the traveling direction of the vehicle, thereby to generate the display image to be used for the AR navigation. In this case, the CPU 21 obtains the deviation of the image capturing direction with respect to the traveling direction, and corrects the captured image based on the deviation such that the center position of the display image in the left-right direction coincides with the position corresponding to the traveling direction.

In this specification, "correcting the captured image" means the processing of extracting the image to be displayed from the captured image of the camera 29 based on the deviation of the image capturing direction with respect to the traveling direction, i.e., the processing of taking in a part of the captured image as the display image.

Figure 4:
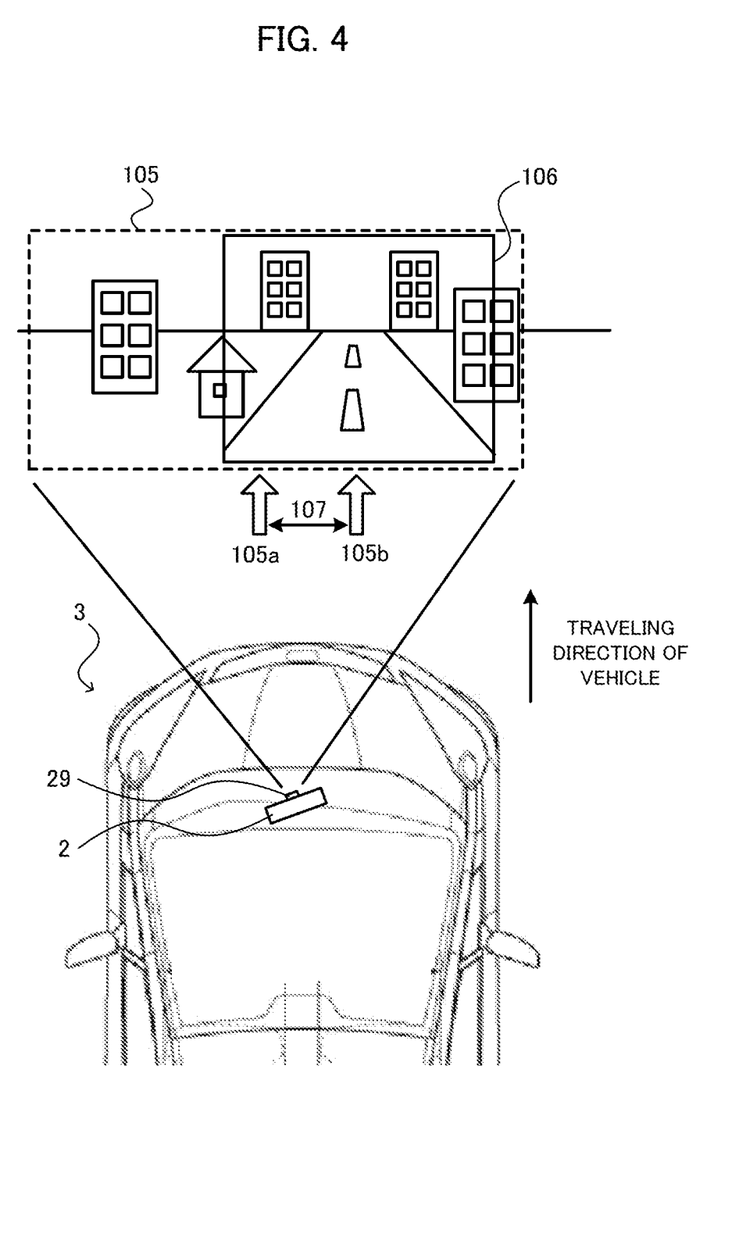
FIG. 4 is a diagram for explaining a fundamental concept of a correcting method of a captured image according to an embodiment.

With reference to FIG. 4, fundamental concept of the correction method of the captured image according to this embodiment will be described. Similarly to FIG. 3, FIG. 4 also illustrates the view of the terminal device 2 in the state mounted in the compartment of the vehicle 3 observed from upside, and an example of the captured image by the camera 29 of the terminal device 2. In FIG. 4, for convenience of explanation, the terminal device 2 is illustrated in the simplified manner, and the illustration of the terminal holding device 1 is omitted.

FIG. 4 illustrates the case where the terminal device 2 is mounted between the driver's seat and the assistant driver's seat (specifically at the position on the dashboard) and the captured image 105 shown by the broken line is obtained by the camera 29. In this case, as described above, if the terminal device 2 is mounted such that the display unit 25 is directed to the user, the front direction (vertical direction) of the rear surface 2b to which the camera 29 is provided in the terminal device 2 does not coincide with the traveling direction of the vehicle 3. Therefore, the image capturing direction of the camera 29 does not coincide with the traveling direction of the vehicle 3. Therefore, the center position 105a of the captured image 105 does not coincide with the position corresponding to the traveling direction of the vehicle 3 in the captured image 105.

In this embodiment, the CPU 21 performs the processing of correcting the deviation between the center position 105a in the captured image 105 and the position corresponding to the traveling direction. Specifically, first the CPU 21 obtains the deviation of the image capturing direction of the camera 29 with respect to the traveling direction of the vehicle 3 based on the acceleration of the vehicle 3. Next, the CPU 21 obtains the position 105b, which is obtained by shifting the center position 105a in the captured image 105 by the amount corresponding to the deviation (corresponding to the arrow 107). In this embodiment, the position 105b thus obtained is treated as the position corresponding to the traveling direction in the captured image 105.

Next, in order to make the center position in the left-right direction of the display image coincide with the position corresponding to the traveling direction, the CPU 21 extracts the image whose center position in the left-right direction coincides with the position 105b, and uses the extracted image as the display image. Specifically, the CPU 21 generates an image 106 within a predetermined range from the position 105b corresponding to the center position (i.e., an image 106 having predetermined size in the left-right direction) as the display image. In this case, the CPU 21 cuts off the image other than the image 106 (i.e., the images at both ends of the image 106) from the captured image 105.

The "predetermined range" used at the time of generating the display image is determined in advance according to the size and/or range of the image to be displayed. For example, the "predetermined range" is determined by the setting in the AR navigation.

Figure 5:
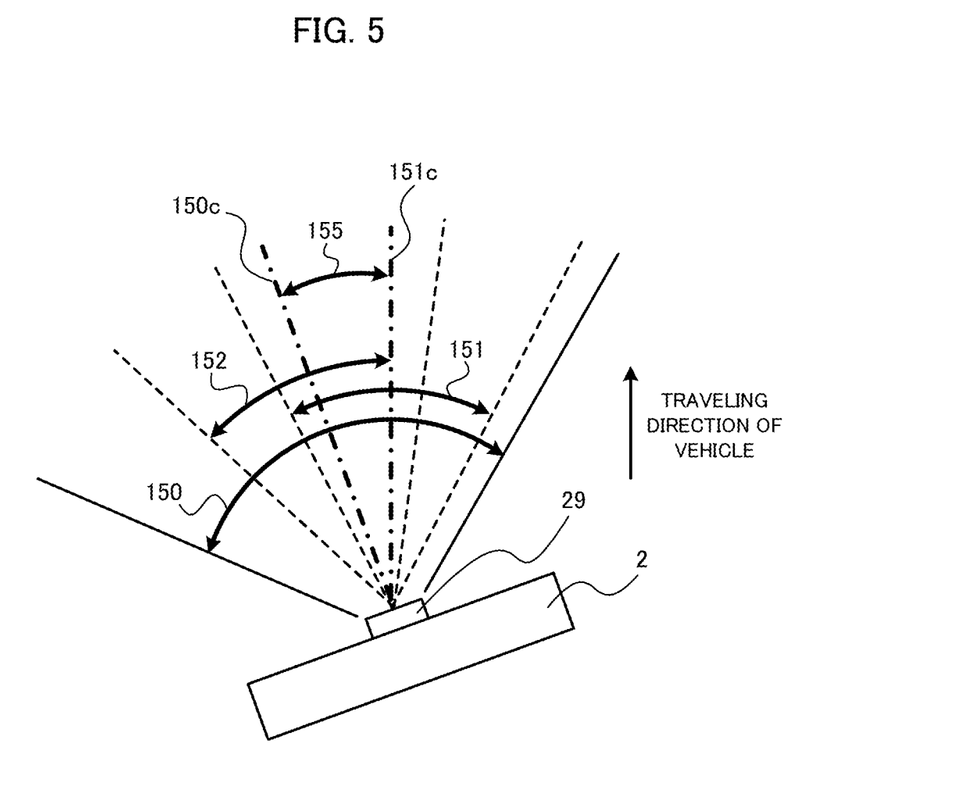
FIG. 5 is a diagram for explaining the correcting method of a captured image according to the embodiment more specifically.

With reference to FIG. 5, the correcting method of the captured image according to this embodiment will be described more specifically. FIG. 5 illustrates a view of the terminal device 2 observed from upside thereof. Here, it is a view of the state that the image capturing direction of the camera 29 does not coincide with the traveling direction of the vehicle 3. In FIG. 5, for convenience of explanation, the terminal device 2 is illustrated in a simplified manner, and the illustration of the terminal holding device 1 is omitted.

In FIG. 5, an angle of view shown by the arrow 150 is the angle of view used by the camera 29 for capturing image. Namely, the angle of view 150 indicates the angle of view of the camera 29 itself. The dot and dash line 150c indicates the center position in the angle of view 150 that the camera 29 uses for capturing image, i.e., the position corresponding to the image capturing direction. It is assumed that the CPU 21 knows the angle of view 150 that the camera 29 uses for capturing image and the center position 150c in the angle of view 150.

In this embodiment, first the CPU 21 obtains the angle that the image capturing direction of the camera 29 forms with respect to the traveling direction of the vehicle 3 (corresponding to the angle shown by the arrow 155, hereinafter suitably referred to as "deviation angle"), based on the output of the sensor 15d. The method of obtaining the deviation angle will be described later in detail.

Next, the CPU 21 obtains the position 151c by shifting the center position 150c of the angle of view 150, that the camera 29 uses for capturing image, by the deviation angle 155. In this case, the CPU 21 treats the obtained position 151c as the position corresponding to the traveling direction of the vehicle 3. Namely, out of the angle of view 150, the CPU 21 uses the position 151c as the center position of the angle of view (hereinafter referred to as "display angle of view") used for the actual display.

Next, in the angle of view 150 that the camera 29 uses for capturing image, the CPU 21 obtains the angle of view (shown by the arrow 151), including the obtained position 151c as a center and having a width of a predetermined angle, as the display angle of view. Thereafter, from the captured image by the camera 29, the CPU 21 generates the image within the range defined by the obtained display angle of view 151 as the display image. As illustrated in FIG. 4, doing this corresponds to generating the image 106 within the predetermined range from the center position 105b, out of the captured image 105, as the display image.

The present invention is not limited to obtain the position 151c corresponding to the traveling direction and to obtain the display angle of view 151 based on the position 151c as described above. In another example, the display angle of view 151 may be obtained without obtaining the position 151c corresponding to the traveling direction. Specifically, the display angle of view may be obtained by shifting the display angle of view, normally used for generating the display image from the captured image as shown by the arrow 152 (the angle of view including the center position 150c and having a width of a predetermined angle), by the deviation angle 155.

According to this embodiment as described above, based on the deviation angle of the image capturing direction of the camera 29 with respect to the traveling direction of the vehicle 3, the captured image may be appropriately corrected to generate the display image. Specifically, it is possible to appropriately generate the display image having the position corresponding to the traveling direction of the vehicle 3 as the center position. By this, if the terminal device 2 is mounted in a state that it is not directed to the traveling direction of the vehicle 3 (i.e., the image capturing direction of the camera 29 does not coincide with the traveling direction of the vehicle 3), the AR navigation can be appropriately performed by using the generated display image. For example, the image used for route guide in the AR navigation can be displayed at an appropriate position on the display image.

Further, according to this embodiment, unlike the technique described in the aforementioned Patent Document 1, the image analysis of the captured image is not performed. Therefore, in comparison with that technique, the processing burden may be reduced.

Desirably, the angle of view of the camera 29 is designed such that, within the range of the direction of the terminal device 2 supposed to be set by the user in order to observe the display unit 25, all the display angle of view obtained when the user variously changes the direction of the terminal device 2 are included in the range of the angle of view of the camera 29 itself. Namely, it is desired to use the camera 29 having the angle of view covering all the display angle of view obtained as described above, even if the user variously changes the direction of the terminal device 2 within the range of the supposed direction of the terminal device 2.

[Deviation Angle Calculating Method]

Next, with reference to FIGS. 6A to 6C, the description will be given of a specific example of a method of calculating the deviation angle of the image capturing direction with respect to the traveling direction of the vehicle 3.

Figure 6A:
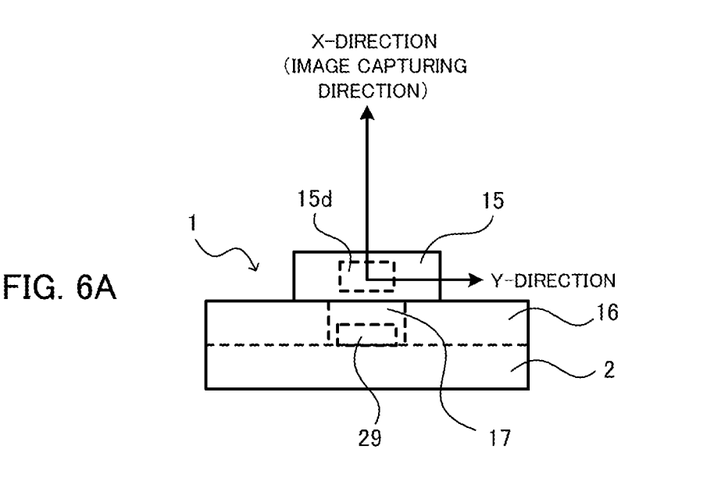
FIGS. 6A to 6C are diagrams for explaining a method of calculating a deviation angle of the image capturing direction of a camera with respect to a traveling direction of a vehicle.

FIG. 6A illustrates a view of the terminal device 2 in a state held by the terminal holding device 1 observed from upside thereof. In FIG. 6A, for convenience of explanation, the terminal holding device 1 and the terminal device 2 are illustrated in a simplified manner. As illustrated in FIG. 6A, the sensor 15d is provided in the substrate holder 15 of the terminal holding device 1. The sensor 15d is an acceleration sensor (i.e., G sensor) configured to be able to detect acceleration in two-dimensional directions. In the following description, the "sensor 15d" will be expressed as the "acceleration sensor 15d". As described above, in the state that the terminal device 2 is held by the terminal holding device 1 (specifically, in the state that the connector of the terminal device 2 is connected with the connector 16a in the terminal holder 16), the output signal of the acceleration sensor 15d is supplied to the terminal device 2 via the sensor substrate 15c in the substrate holder 15 and the wiring 16b and the connector 16a in the terminal holder 16. In this case, the CPU 21 in the terminal device 2 obtains the output signal of the acceleration sensor 15d.

Specifically, the acceleration sensor 15d detects the acceleration in the X-direction and the Y-direction as shown in FIG. 6A. Since the acceleration sensor 15d is fixed to the terminal holding device 1 and its positional relation with the camera 29 of the terminal device 2 attached to the terminal holding device 1 is constant, the X-direction and Y-direction in which the acceleration sensor 15d detects the acceleration have a constant relation with the image capturing direction of the camera 29. In this embodiment, as illustrated in FIG. 6A, the X-direction and the image capturing direction coincide.

Figure 6B:
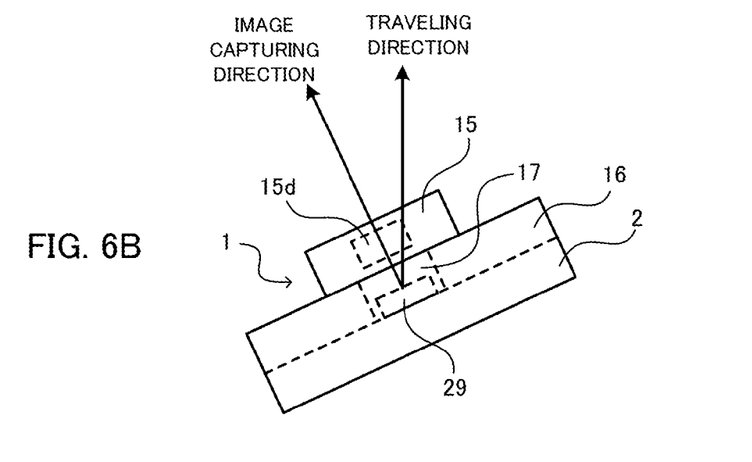

While FIG. 6B illustrates the terminal device 2 in the state held by the terminal holding device 1 similarly to FIG. 6A, FIG. 6B illustrates the state that the terminal device 2 is not directed to the traveling direction of the vehicle 3, i.e., the state that the image capturing direction of the camera 29 does not coincide with the traveling direction of the vehicle 3. In a state that the terminal device 2 is held by the terminal holding device 1, the direction of the terminal holding device 1 coincides with the direction of the terminal device 2. Therefore, by the acceleration sensor 15d in the terminal holding device 1, the direction of the terminal device 2 (specifically the image capturing direction by the camera 29 in the terminal device 2) can be appropriately detected.

Figure 6C:
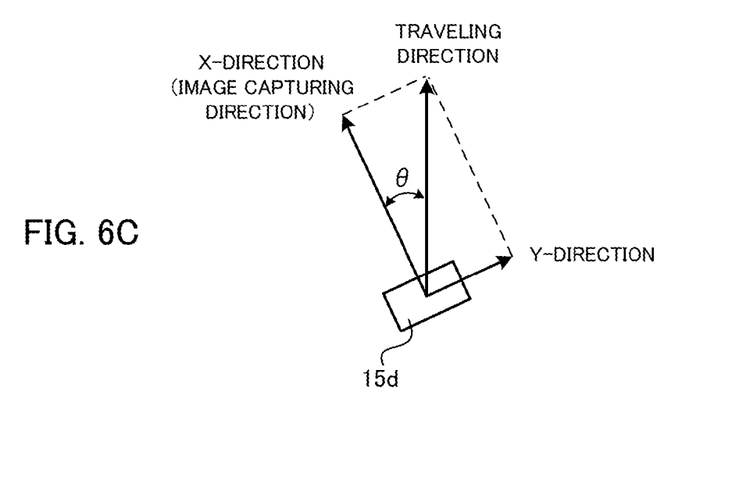

FIG. 6C illustrates only the acceleration sensor 15d in FIG. 6B. The acceleration sensor 15d detects acceleration in two-dimensional directions, i.e., the X-direction and the Y-direction as shown in FIG. 6C. The X-direction corresponds to the image capturing direction of the camera 29. When the image capturing direction of the camera 29 deviates from the traveling direction of the vehicle 3, the deviation angle θ of the image capturing direction (X-direction) with respect to the traveling direction of the vehicle 3 can be calculated from the ratio of the X-direction acceleration to the Y-direction acceleration detected by the acceleration sensor 15d. The deviation angle θ can be calculated by the following equation (1):

$$\text{Deviation Angle } \theta = \arctan(\text{Y-direction acceleration}/\text{X-direction acceleration}) \quad (1)$$

Specifically, the deviation angle θ is calculated by the CPU 21 in the terminal device 2. In this case, the CPU 21 obtains the output signals corresponding to the X-direction acceleration and the Y-direction acceleration detected by the acceleration sensor 15d, and calculates the deviation angle θ based on the output signals.

While the above description discloses the example of calculating the deviation angle based on the output of the acceleration sensor 15d provided in the substrate holder 15 of the terminal holding device 1, the present invention is not limited to this. Instead of the acceleration sensor 15d, the output from the sensor provided in the vehicle 3 or the output from the sensor provided in a navigation apparatus installed in the vehicle 3 separately from the terminal device 2 may be used to calculate the deviation angle.

[Captured Image Correcting Processing]

Figure 7:
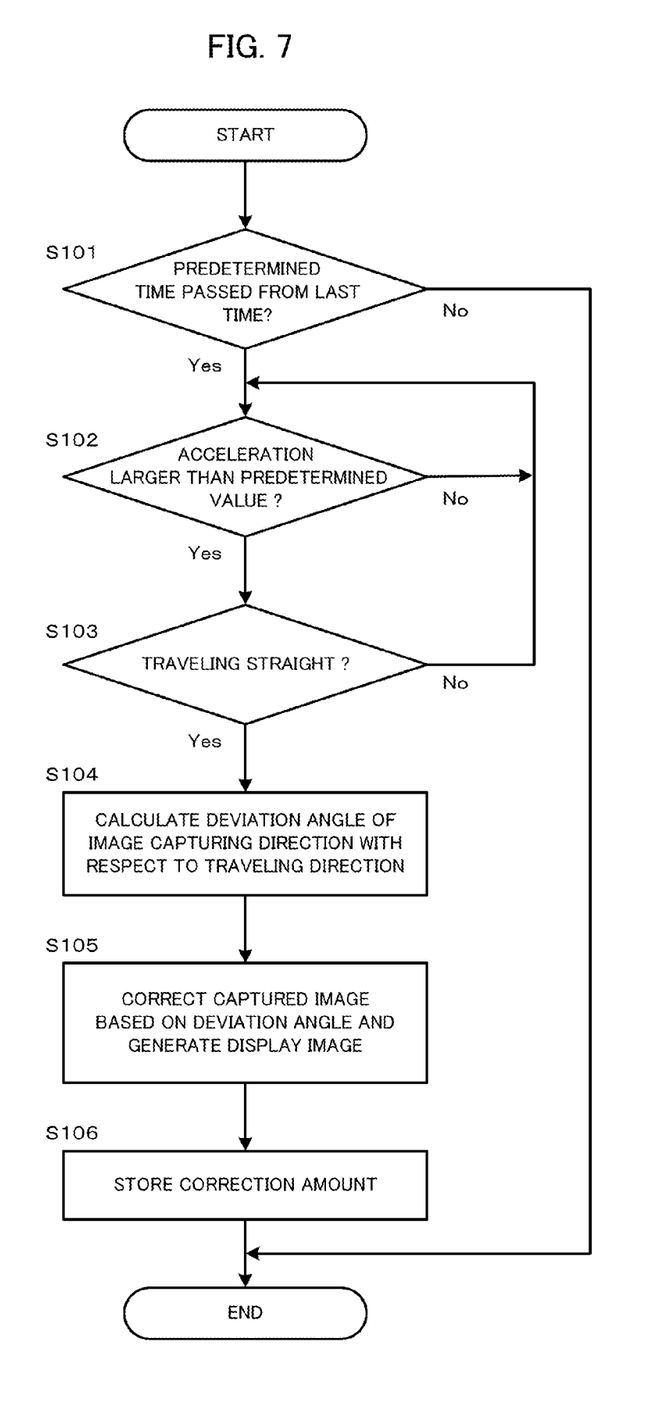
FIG. 7 is a flowchart illustrating a captured image correcting processing according to the embodiment.

Next, with reference to FIG. 7, the captured image correcting processing according to this embodiment will be described. FIG. 7 is a flowchart illustrating the captured image correcting processing according to this embodiment. This processing is realized by the CPU 21 in the terminal device 2, which executes the program stored in the ROM 22.

First, in step S101, the CPU 21 determines whether or not a predetermined time has passed since the captured image correcting processing is executed last time. This determination is executed every predetermined time period (i.e., in a predetermined cycle) in order to repeatedly execute the captured image correcting processing. If the predetermined time has passed (step S101; Yes), the processing goes to step S102. If the predetermined time has not passed (step S101; No), the processing ends.

In step S102, the CPU 21 determines whether or not the acceleration of the vehicle 3 is larger than a predetermined value. For example, the CPU 21 determines whether or not the X-direction acceleration detected by the acceleration sensor 15d is larger than a predetermined value. This determination is executed in order to execute the subsequent steps by using a stable output value of the acceleration sensor 15d, thereby ensuring the accuracy of correcting the captured image. The "predetermined value" used in this determination may be set to the acceleration value capable of ensuring the accuracy of correcting the captured image, for example.

If the acceleration is larger than the predetermined value (step S102; Yes), the processing goes to step S103. If the acceleration is not larger than the predetermined value (step S102), the processing returns to step S102.

In step S103, the CPU 21 determines whether the vehicle 3 is traveling in a straight line (i.e., going straight). Specifically, the CPU 21 determines whether or not the vehicle 3 is traveling in a straight line, based on the ratio of the X-direction acceleration to the Y-direction acceleration detected by the acceleration sensor 15d. In detail, the CPU 21 samples plural ratios of the X-direction acceleration (larger than a predetermined value) to the Y-direction acceleration. Then, the CPU 21 determines that the vehicle 3 is traveling in a straight line if the values of the plural ratios are almost constant, and determines that the vehicle 3 is not traveling in a straight line if the values of the plural ratios are varying. This determination is also executed in view of ensuring the accuracy of correcting the captured image. Specifically, this determination is done to execute the correction of the captured image using the output value of the acceleration sensor 15d at the time when the traveling direction of the vehicle 3 coincide with the front-rear direction of the vehicle 3.

If the vehicle 3 is traveling in a straight line (step S103; Yes), the processing goes to step S104. If the vehicle 3 is not traveling in a straight line (step S103; No), the processing returns to step S102.

In step S104, the CPU 21 calculates the deviation angle of the image capturing direction of the camera 29 with respect to the traveling direction of the vehicle 3. For example, the CPU 21 calculates the deviation angle by the equation (1), based on the ratio of the X-direction acceleration to the Y-direction acceleration detected by the acceleration sensor 15d. Then, the processing goes to step S105.

In step S105, the CPU 21 corrects the captured image based on the deviation angle calculated in step S104, and generates the display image. Specifically, the CPU 21 obtains the position where the center position of the angle of view that the camera 29 uses for capturing image is shifted by the deviation angle, and determines the angle of view, including the obtained position as the center and having a width of a predetermined angle, as the display angle of view. Instead, the CPU 21 may determines the angle of view, which is obtained by shifting the display angle of view normally used to generate the display image from the captured image by the deviation angle, as the display angle of view. Thereafter, from the captured image, the CPU 21 generates the image within the range prescribed by the display angle of view thus obtained, as the display image. The CPU 21 displays the display image thus generated on the display unit 25. Then, the processing goes to step S106.

In step S106, the CPU 21 stores the data of the deviation angle and/or the display angle of view, used to generate the display image in step S105, in the ROM 22 as the correction amount. Then, the processing ends. Until the above-mentioned predetermined time has passed (i.e., in the case where "step S101; No"), the CPU 21 corrects the captured image by using the correction amount stored in step S106 and generate the display image. The CPU 21 retains the correction amount after the engine of the vehicle 3 is turned off, and uses the retained correction amount after the engine is started until the acceleration becomes larger than the predetermined value.

According to the captured image correcting processing described above, based on the deviation angle of the image capturing direction of the camera 29 with respect to the traveling direction of the vehicle 3, the captured image can be appropriately corrected to generate the display image. Specifically, it is possible to generate the display image having the position corresponding to the traveling direction of the vehicle 3 as the center position. Therefore, even if the terminal device 2 is mounted in a state not directed to the traveling direction of the vehicle 3, the AR navigation can be appropriately performed by using the generated display image.

In the example described above, it is determined whether or not the vehicle 3 is traveling in a straight line based on the ratio of the X-direction acceleration to the Y-direction acceleration detected by the acceleration sensor 15d (step S103). However, the present invention is not limited to the determination based on the ratio of the X-direction acceleration to the Y-direction acceleration. In another example, it can be determined whether or not the vehicle 3 is traveling in a straight line based on the navigation information used by the AR navigation. Specifically, it is possible to determine whether the road that the vehicle 3 is currently traveling is straight or curved from the navigation information such as the route information and/or the map information, and determines that the vehicle 3 is traveling in a straight line in step S103 when the road currently traveling is determined to be straight.

While the captured image correcting processing of FIG. 7 executes all the determinations of steps S101, S102 and S103 in the above-described example, any one or more of the determination in steps S101, S102 and S103 ma be executed instead. Namely, any one or two of the determination in steps S101, S102 and S103 is executed, and the captured image may be corrected if the condition in the determination is satisfied.

MODIFIED EXAMPLES

In the above description, the embodiment is described in which the captured image correcting processing is repeatedly executed in a predetermined cycle. In the modified example, instead of repeatedly executing the captured image correcting processing in a predetermined cycle, the captured image correcting processing is executed only when the mounting condition of the terminal device 2 is changed.

Figure 8:
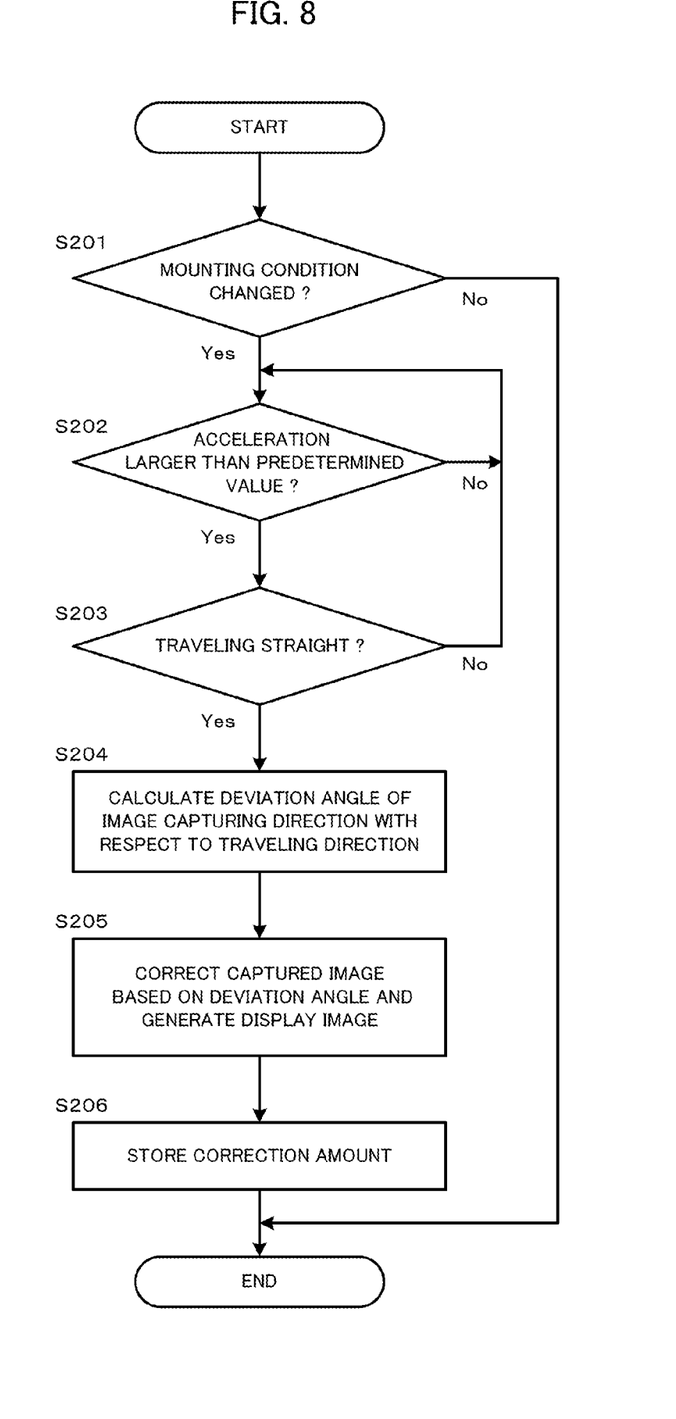
FIG. 8 is a flowchart illustrating a captured image correcting processing according to a modified example.

With reference to FIG. 8, the captured image correcting processing according to the modified example will be described. FIG. 8 is a flowchart illustrating the captured image correcting processing according to the modified example. This processing is realized by the CPU 21 in the terminal device 2 which executes the program stored in the ROM 22.

The modified example differs from the above-described embodiment in that the process in step S201 is executed instead of the process in step S101 shown in FIG. 7. Since the process in steps S202 to S206 are the same as the process in steps S102 to S106 shown in FIG. 7, description thereof will be omitted. Here, only the process in step S201 will be described.

In step S201, the CPU 21 determines whether or not the mounting condition of the terminal device 2 is changed. In this case, the CPU 21 determines whether the user changed the direction of the terminal device 2, whether the user removed the terminal device 2 from the terminal holding device 1, or whether the user attached the terminal device 2 to the terminal holding device 1. The reason why such a determination is made is to execute the correction of the captured image in the case where the mounting condition of the terminal device 2 is changed and accordingly the deviation angle of the image capturing direction of the camera 29 with respect to the traveling direction of the vehicle 3 tends to change. Namely, when the mounting condition of the terminal device 2 is changed, it is not appropriate to correct the captured image by the correction amount obtained last time, and the captured image should be corrected after obtaining new correction amount.

Specifically, the CPU 21 determines whether or not the mounting condition of the terminal device 2 is changed by the methods described by the following first to fourth examples. It is noted that the CPU 21 corresponds to an example of the mounting change detecting unit.

In the first example, the terminal holding device 1 is provided with an acceleration sensor capable of detecting the acceleration in an up-down direction, and the CPU 21 determines whether or not the mounting condition of the terminal device 2 is changed based on the output of the acceleration sensor. Specifically, the CPU 21 determines that the mounting condition of the terminal device 2 is changed if the acceleration sensor detects the acceleration in the up-down direction. For example, the method of the first example may be realized by providing the terminal holding device 1 with an acceleration sensor capable of detecting acceleration in the three-dimensional directions, instead of the above-mentioned acceleration sensor 15d.

In the second example, the CPU 21 determines that the mounting condition of the terminal device 2 is changed when acceleration sensor 15d detects the acceleration that is never caused by a normal handle operation. Specifically, the CPU 21 samples plural ratios of the X-direction acceleration to the Y-direction acceleration, and determines that the mounting condition of the terminal device 2 is changed when the values of the plural ratios thus sampled are largely varying. For example, the CPU 21 determines that the mounting condition of the terminal device 2 is changed if the values of the plural ratios thus sampled are larger than the value of the ratio of the X-direction acceleration to the Y-direction acceleration normally occurs when the vehicle 3 curves.

In the third example, the CPU 21 determines whether or not the mounting condition of the terminal device 2 is changed based on the navigation information used by the AR navigation and the output of the acceleration sensor 15d. Specifically, the CPU 21 determines that the mounting condition of the terminal device 2 is changed if the road that the vehicle 3 is currently traveling is determined to be a straight road according to the navigation information and the acceleration sensor 15d detects the acceleration that is never caused during the straight traveling. Specifically, during the straight traveling, the value of the ratio of the X-direction acceleration to the Y-direction acceleration becomes almost constant. However, if the value of the ratio is varying, the CPU 21 determines that the mounting condition of the terminal device 2 is changed. On the other hand, the CPU 21 does not perform the determination as to whether or not the mounting condition of the terminal device 2 is changed, if the road that the vehicle 3 is currently traveling is determined to be curving according to the navigation information. In this case, the output value of the acceleration sensor 15d tends to be unstable, and hence the determination as to the mounting condition is not performed to prevent erroneous determination.

In the fourth example, the CPU 21 determines that the mounting condition of the terminal device 2 is changed, when the user operates the operation unit 28 of the terminal device 2. Namely, the CPU 21 determines that the mounting condition of the terminal device 2 is changed when some inputs are made via the operation unit 28. For example, the CPU 21 determines that the mounting condition of the terminal device 2 is changed when an operation to end the AR navigation or an operation to power off the terminal device 2 is made.

When it is determined that the mounting condition of the terminal device 2 is changed (step S201; Yes) by the methods according to the first to fourth examples described above, the processing goes to step S202. When it is not determined that the mounting condition of the terminal device 2 is changed (step S201; No), the processing ends. The present invention is not limited to the determination of using only one of the first to fourth examples. Any two or more of the first to fourth examples may be used, in combination, to perform the determination.

According to the modified example described above, the mounting condition of the terminal device 2 can be appropriately detected, and the captured image can be appropriately corrected when the mounting condition is changed. Also, according to the modified example, since the captured image correcting processing is not repeatedly executed in a predetermined cycle unlike the above-described embodiment (see. FIG. 7), the processing burden may be reduced. In the above-described embodiment, since the captured image correcting process is repeatedly executed in a predetermined cycle, the captured image can be corrected at any time, without consideration of the change of the mounting condition of the terminal device 2.

While the captured image correcting processing of FIG. 8 executes all the determinations of steps S201, S202 and S203 in the above-described example, any one or more of the determination in steps S201, S202 and S203 ma be executed instead. Namely, any one or two of the determination in steps S201, S202 and S203 is executed, and the captured image may be corrected if the condition in the determination is satisfied.

While the present invention is applied to a vehicle in the above description, the application of the present invention is not limited to this. The present invention may be applied to various movable bodies such as a ship, a helicopter and an airplane other than the vehicle.

As described above, the embodiment is not limited to the embodiment described above, and may be alterable as needed without contradicting the gist and the idea of the invention readable from claims and specification in its entirety.

INDUSTRIAL APPLICABILITY

The present invention can be used in a cell phone having a telephone call function and a navigation apparatus performing route guide.

DESCRIPTION OF REFERENCE NUMBERS

1 Terminal Holding Device
2 Terminal Device
15 Substrate Holder
15d Sensor (Acceleration Sensor)
16 Terminal Holder
17 Hole
21 CPU
25 Display Unit
28 Operation Unit
29 Camera

The invention claimed is:

1. A terminal device mounted on a movable body, comprising:
    an image capturing unit;
    an image generating unit which generates a display image corresponding to a traveling direction of the movable body from a captured image captured by the image capturing unit based on a deviation of an image capturing direction of the image capturing unit with respect to the traveling direction of the movable body; and
    a display unit which displays the display image generated by the image generating unit,
    wherein the image generating unit obtains an output from an acceleration sensor which detects acceleration of the movable body in two-dimensional directions, and obtains the deviation of the image capturing direction with respect to the traveling direction based on the output from the acceleration sensor.

2. The terminal device according to claim 1, wherein the image generating unit obtains the deviation of the image capturing direction with respect to the traveling direction when the movable body is traveling straight, and corrects the captured image based on the obtained deviation.

3. The terminal device according to claim 1, wherein the image generating unit obtains the deviation of the image capturing direction with respect to the traveling direction when an acceleration of the movable body is larger than a predetermined value, and corrects the captured image based on the obtained deviation.

4. The terminal device according to claim 1, wherein the image generating unit cuts out a part of the captured image determined based on the deviation to generate the display image.

5. The terminal device according to claim 1, wherein the image generating unit repeatedly obtains the deviation of the image capturing direction with respect to the traveling direction in a predetermined cycle, and corrects the captured image based on the obtained deviation.

6. The terminal device according to claim 1, further comprising a mounting change detecting unit which detects a change of mounting condition of the terminal device,
wherein the image generating unit obtains the deviation of the image capturing direction with respect to the traveling direction when the mounting change detecting unit detects the change of the mounting condition, and corrects the captured image based on the obtained deviation.

7. The terminal device according to claim 1, wherein the image generating unit corrects the captured image such that a center position of the display image in a left-right direction coincides with a position corresponding to the traveling direction of the movable body.

8. The terminal device according to claim 7, wherein the image generating unit performs a correction of setting a position, which is obtained by shifting the center position of the captured image in the left-right direction to the left-right direction by an amount corresponding to the deviation of the image capturing direction with respect to the traveling direction, to the center position of the display image in the left-right direction, and thereby generates the display image.

9. The terminal device according to claim 8, wherein the image generating unit generates an image, which is prescribed by the center position after the correction and which is within a predetermined range in the captured image, as the display image.

10. The terminal device according to claim 1, wherein the terminal device is attachable to and removable from a holding device mounted on the movable body.

11. An image processing method executed by a terminal device which includes an image capturing unit and a display unit and which is mounted on a movable body, comprising:
an obtaining process which obtains a captured image captured by the image capturing unit;
an image generating process which generates a display image corresponding to a traveling direction of the movable body from the captured image based on a deviation of an image capturing direction of the image capturing unit with respect to the traveling direction of the movable body; and
a display process which displays the display image generated by the image generating process on the display unit,
wherein the image generating process obtains an output from an acceleration sensor which detects acceleration of the movable body in two-dimensional directions, and obtains the deviation of the image capturing direction with respect to the traveling direction based on the output from the acceleration sensor.

12. An image processing computer program product stored in a non-transitory computer readable medium and executed by a terminal device which includes an image capturing unit, a display unit and a computer and which is mounted on a movable body, the computer program product stored in the non-transitory computer readable medium being configured to make the computer function as:
an obtaining unit which obtains a captured image captured by the image capturing unit;
an image generating unit which generates a display image corresponding to a traveling direction of the movable body from the captured image based on a deviation of an image capturing direction of the image capturing unit with respect to the traveling direction of the movable body; and
a display control unit which displays the display image generated by the image generating unit on the display unit,
wherein the image generating unit obtains an output from an acceleration sensor which detects acceleration of the movable body in two-dimensional directions, and obtains the deviation of the image capturing direction with respect to the traveling direction based on the output from the acceleration sensor.

\* \* \* \* \*